(12) United States Patent
Zhang et al.

(10) Patent No.: US 7,826,177 B1
(45) Date of Patent: Nov. 2, 2010

(54) FLEXURE HAVING ARMS WITH REDUCED CENTROID OFFSET FOR SUPPORTING A HEAD IN A DISK DRIVE

(75) Inventors: Yiduo Zhang, Cupertino, CA (US); Tzong-Shii Pan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 570 days.

(21) Appl. No.: 11/582,794

(22) Filed: Oct. 18, 2006

(51) Int. Cl.
*G11B 5/48* (2006.01)

(52) U.S. Cl. .................................. 360/245.3; 360/245.9

(58) Field of Classification Search ............... 360/245.3, 360/245.4, 245.5, 245.6, 245.7, 248.8, 245.9
See application file for complete search history.

(56) References Cited

U.S. PATENT DOCUMENTS

| | | | |
|---|---|---|---|
| 5,790,347 A | 8/1998 | Girard | |
| 5,862,017 A * | 1/1999 | Kohira et al. | 360/245.6 |
| 5,873,159 A | 2/1999 | Arya et al. | |
| 5,889,636 A | 3/1999 | Arya et al. | |
| 5,896,247 A | 4/1999 | Pan et al. | |
| 5,973,884 A | 10/1999 | Hagen | |
| 6,055,132 A | 4/2000 | Arya et al. | |
| 6,351,348 B1 | 2/2002 | Erpelding et al. | |
| 6,377,425 B1 | 4/2002 | Khan | |
| 6,404,595 B1 | 6/2002 | Iwamoto | |
| 6,747,849 B1 | 6/2004 | Le et al. | |
| 6,940,694 B2 * | 9/2005 | Ohwe et al. | 360/234.6 |
| 6,952,329 B2 | 10/2005 | Childers et al. | |
| 6,954,339 B2 | 10/2005 | Bemet et al. | |
| 6,992,862 B2 | 1/2006 | Childers et al. | |
| 6,993,824 B2 | 2/2006 | Childers et al. | |
| 7,152,303 B2 | 12/2006 | Childers et al. | |
| 7,535,678 B2 * | 5/2009 | Arya | 360/245.7 |
| 2006/0181810 A1 * | 8/2006 | Nakamura et al. | 360/245.3 |

* cited by examiner

*Primary Examiner*—Jefferson Evans

(57) ABSTRACT

A flexure for supporting a head in a disk drive includes a tongue including a head mounting surface for attaching the head. The flexure further includes a first arm on a first side of the tongue. The first arm includes a structural material and has a first cross-sectional area in a plane perpendicular to the head mounting surface. The first cross-sectional area has a first centroid. The flexure further includes a second arm on the first side of the tongue. The second arm includes a conductive material layer. The second arm has a second cross-sectional area in the plane perpendicular to the head mounting surface. The second cross-sectional area has a second centroid. The second centroid is not offset from the first centroid by more than 10 microns in a direction perpendicular to the head mounting surface.

19 Claims, 10 Drawing Sheets

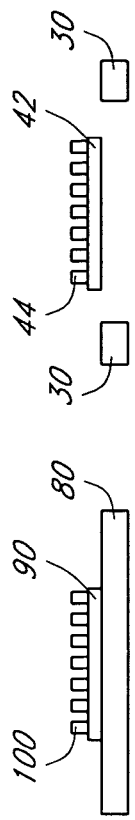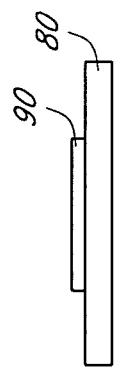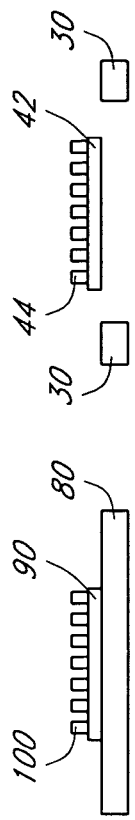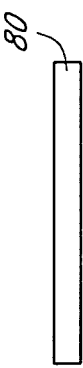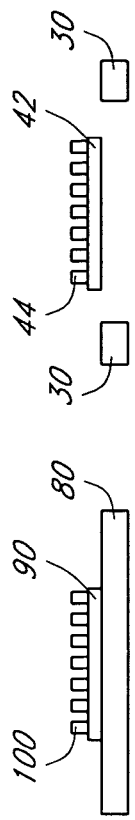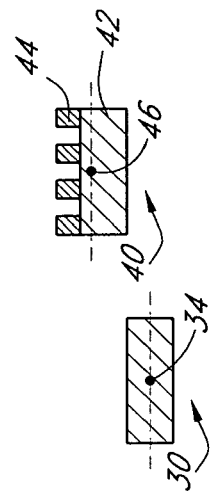

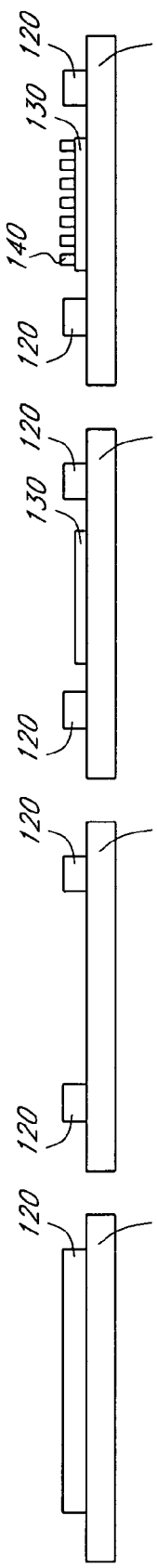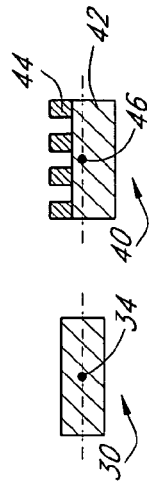

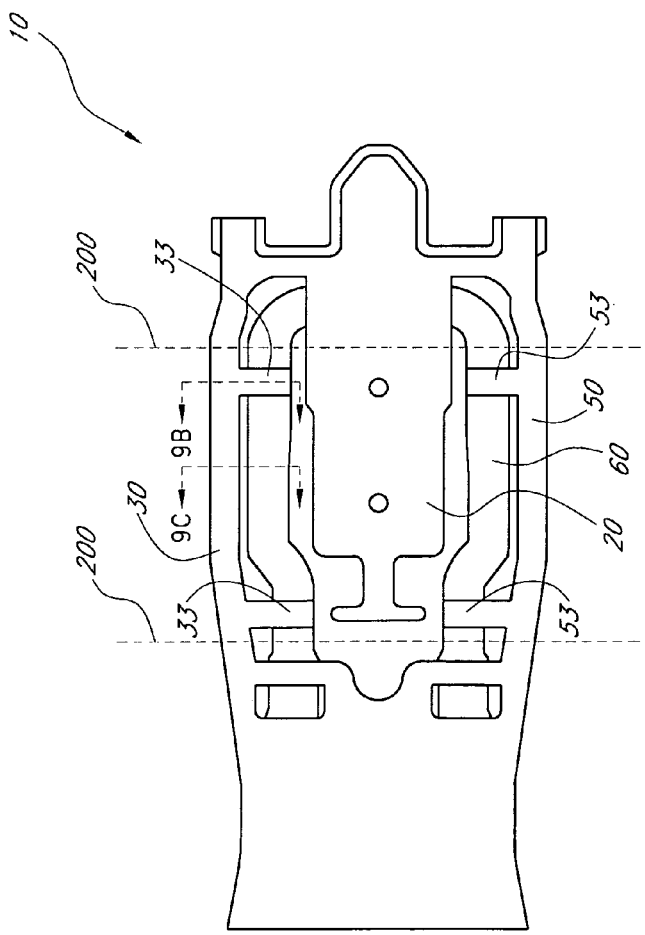
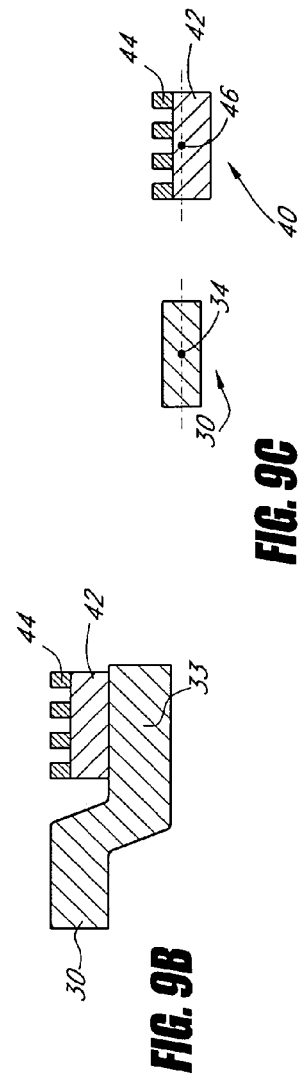
FIG. 9A
FIG. 9B
FIG. 9C

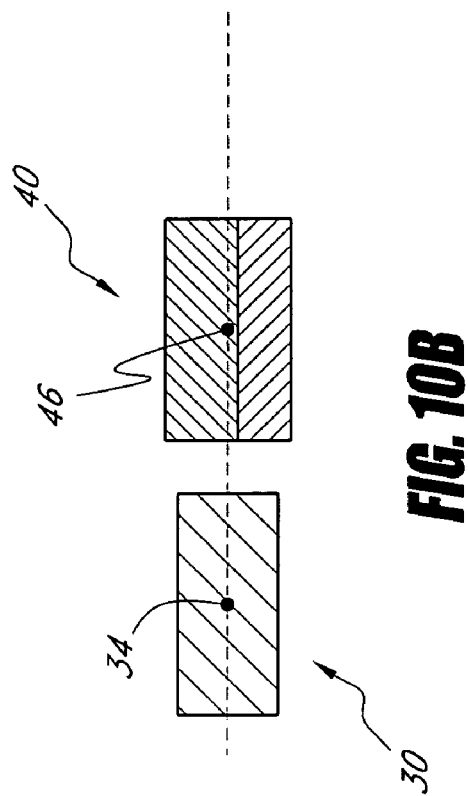
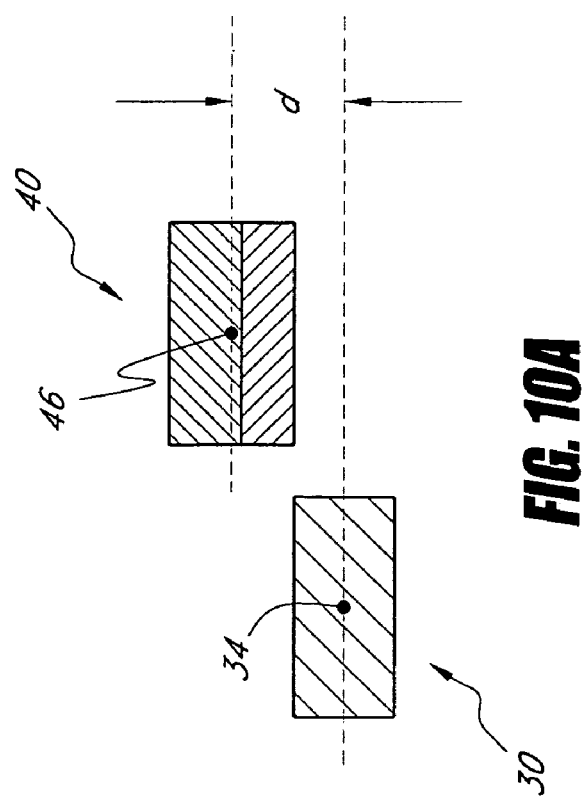

FLEXURE HAVING ARMS WITH REDUCED CENTROID OFFSET FOR SUPPORTING A HEAD IN A DISK DRIVE

BACKGROUND OF THE INVENTION

1. Field of the Invention

This invention relates generally to disk drives, and more particularly, to flexures for supporting a head in a disk drive.

2. Description of the Related Art

Disk drives (e.g., magnetic disk drives) utilize a rotating media surface and a head that is suspended above the rotating media surface. The head typically includes a slider (e.g., comprising a ceramic material), one or more transducers (e.g., read transducer, write transducer), and heater elements. The slider comprises a surface facing the rotating media surface and serving as an air bearing to suspend the head above the rotating media surface. The head is attached to a flexure that helps position and move the head from track to track across the rotating media surface. The flexure provides flexibility for pitch and roll motion of the head relative to the rotating media surface.

Flexures typically have a composite or laminate structure with a thin structural layer (e.g., stainless steel), an electrically insulating layer, and patterned electrical leads formed thereon. The flexure is designed to have high lateral stiffness but sufficiently low pitch and roll stiffnesses so that the head can pitch and roll in response to undulations of the rotating media surface without excessive torques acting upon the air bearing. Lower and lower pitch and roll stiffnesses of the flexure are desirable as slider dimensions and fly heights are reduced.

Previous attempts to lower the pitch and roll stiffnesses of the flexure have included: (1) using outboard traces and making the copper traces more flexible to reduce the copper trace stiffness contribution to the total stiffness of the flexure; (2) forming curved traces to reduce the copper trace stiffness contribution; and (3) reducing the thickness of the flexure by using thinner layers (e.g., stainless steel thinner than 15 microns). However these techniques have significant disadvantages. For example, outboard traces may be more easily damaged during head gimbal assembly (HGA) or head stack assembly (HSA) processes. Curved traces can reduce maximum data bandwidth. Thinner flexures may be more prone to damage through ultrasonic cleaning processes, introducing yield problems at both the suspension component level and at the HGA level. Therefore, there is a need in the art for an improved way to reduce the pitch and/or roll stiffnesses of a flexure supporting a head in a disk drive.

SUMMARY OF THE INVENTION

A flexure for supporting a head in a disk drive comprises a tongue including a head mounting surface for attaching the head. The flexure further comprises a first arm on a first side of the tongue. The first arm comprises a structural material and has a first cross-sectional area in a plane perpendicular to the head mounting surface. The first cross-sectional area has a first centroid. The flexure further comprises a second arm on the first side of the tongue. The second arm comprises a conductive material layer. The second arm has a second cross-sectional area in the plane perpendicular to the head mounting surface. The second cross-sectional area has a second centroid. The second centroid is not offset from the first centroid by more than 10 microns in a direction perpendicular to the head mounting surface.

A method of forming a flexure for supporting a head in a disk drive comprises providing a flexure. The flexure comprises a tongue including a head mounting surface for attaching the head. The flexure further comprises a first arm on a first side of the tongue. The first arm comprises a structural material and having a first cross-sectional area in a plane perpendicular to the head mounting surface. The first cross-sectional area has a first centroid. The flexure further comprises a second arm on the first side of the tongue. The second arm comprises a conductive material layer. The second arm has a second cross-sectional area in the plane perpendicular to the head mounting surface. The second cross-sectional area has a second centroid. The second centroid is offset from the first centroid by more than 10 microns in a direction perpendicular to the head mounting surface. The method further comprises plastically deforming at least one of the first arm and the second arm. The second centroid is not offset from the first centroid by more than 10 microns in a direction perpendicular to the head mounting surface.

A method of forming a flexure for supporting a head in a disk drive comprises providing a substrate. The method further comprises forming a first layer over a first portion of the substrate. The first layer comprises a structural material. The method further comprises forming a second layer over a second portion of the substrate laterally spaced from the first portion of the substrate. The second layer comprises an electrically conductive material. The method further comprises removing the substrate.

BRIEF DESCRIPTION OF THE DRAWINGS

FIGS. 6A-6E schematically illustrate cross-sectional views of a sequence of structures produced during the fabrication of a conventional flexure.

FIGS. 7A-7F schematically illustrate cross-sectional views of a sequence of structures produced during the fabrication of a flexure in accordance with certain embodiments described herein.

FIGS. 9A-9C schematically illustrate an example flexure in which the first arm comprises two extensions mechanically coupled to corresponding portions of the second arm and in which the third arm comprises two extensions mechanically coupled to corresponding portions of the fourth arm.

FIG. 10A schematically illustrates a cross-sectional view of the first arm and the second arm with a substantial offset between the first centroid and the second centroid by a distance d.

FIG. 10B schematically illustrates a cross-sectional view of the first arm and the second arm without a substantial offset between the first centroid and the second centroid.

DETAILED DESCRIPTION OF THE PREFERRED EMBODIMENT

Figure 1A:
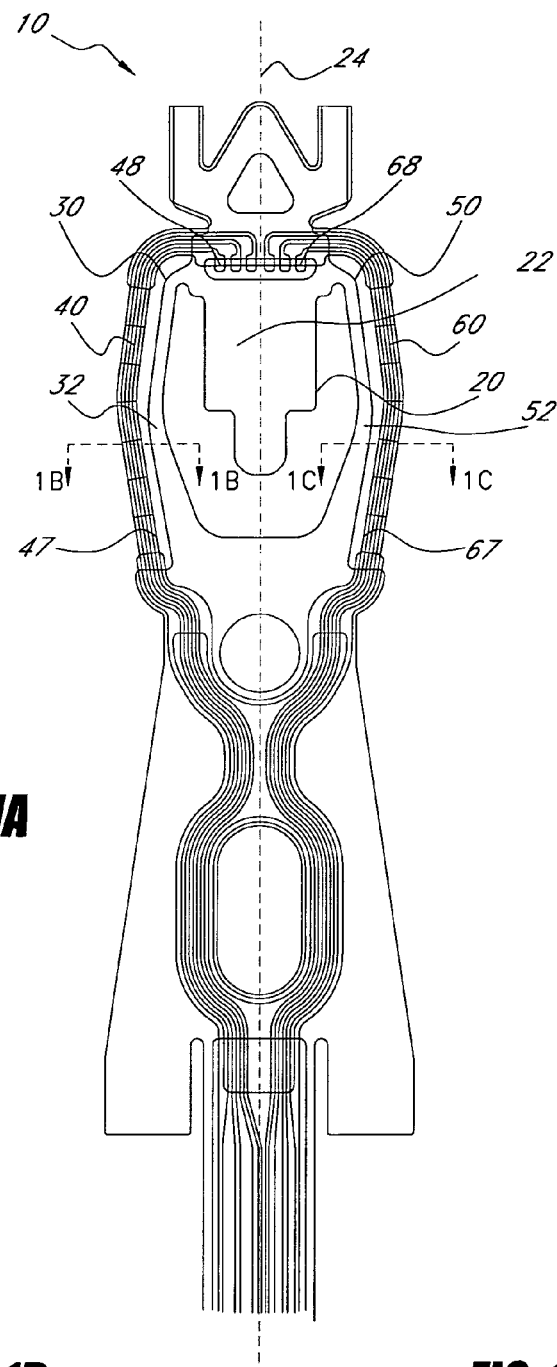
FIG. 1A schematically illustrates an example flexure for supporting a head in a disk drive in accordance with certain embodiments described herein.
Figure 1B:
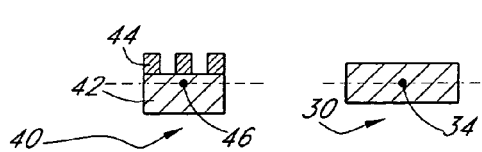
FIG. 1B schematically illustrates a cross-sectional view of a portion of a first arm and a portion of a second arm of the example flexure of FIG. 1A.
Figure 1C:
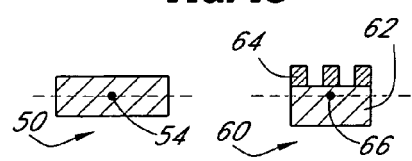
FIG. 1C schematically illustrates a cross-sectional view of a portion of a third arm and a portion of a fourth arm of the example flexure of FIG. 1A.

FIG. 1A schematically illustrates an example flexure 10 for supporting a head in a disk drive in accordance with certain embodiments described herein. The flexure 10 comprises a tongue 20 including a head mounting surface 22 for attaching the head (not shown). The flexure 10 further comprises a first arm 30 on a first side of the tongue 20. The first arm 30 comprises a structural material and has a first cross-sectional area with a first centroid 34. The flexure 10 further comprises a second arm 40 on the first side of the tongue 20. The second arm 40 comprises a conductive material layer 44. The second arm 40 has a second cross-sectional area with a second centroid 46. The second centroid 46 is not offset from the first centroid 34 by more than 10 microns in a direction perpendicular to the head mounting surface 22 of the tongue 20. FIG. 1B schematically illustrates a cross-sectional view of a portion of the first arm 30 and a portion of the second arm 40 of the example flexure 10 of FIG. 1A, and FIG. 1C schematically illustrates a cross-sectional view of a portion of a third arm 50 and a fourth arm 60 of the example flexure 10 of FIG. 1A. FIGS. 2A-2C, 3A-3C, and 4A-4C schematically illustrate other example flexures 10 compatible with certain embodiments described herein.

In certain embodiments, the tongue 20 comprises a structural material (e.g., stainless steel) and is an integral portion of the flexure 10. In certain embodiments, the tongue 20 has a generally elongate shape and extends along a longitudinal axis 24 of the flexure 10, as schematically illustrated by FIG. 1A. For example, in certain embodiments, the tongue 20 has a lateral width generally perpendicular to the longitudinal axis 24 that is in a range between about 0.5 millimeters and about 1.5 millimeters and has a lateral length generally along the longitudinal axis 24 that is up to about 2.5 millimeters. The head mounting surface 22 is generally planar, and defines a direction generally perpendicular or normal to the head mounting surface 22. In certain embodiments, the head mounting surface 22 is substantially flat, while in certain other embodiments, the head mounting surface 22 has one or more recesses, protrusions, holes, extensions, or other structural elements configured to facilitate mounting of the head to the head mounting surface 22. In certain embodiments, the tongue 20 has a thickness between about 10 microns and about 25 microns.

Figure 3A:
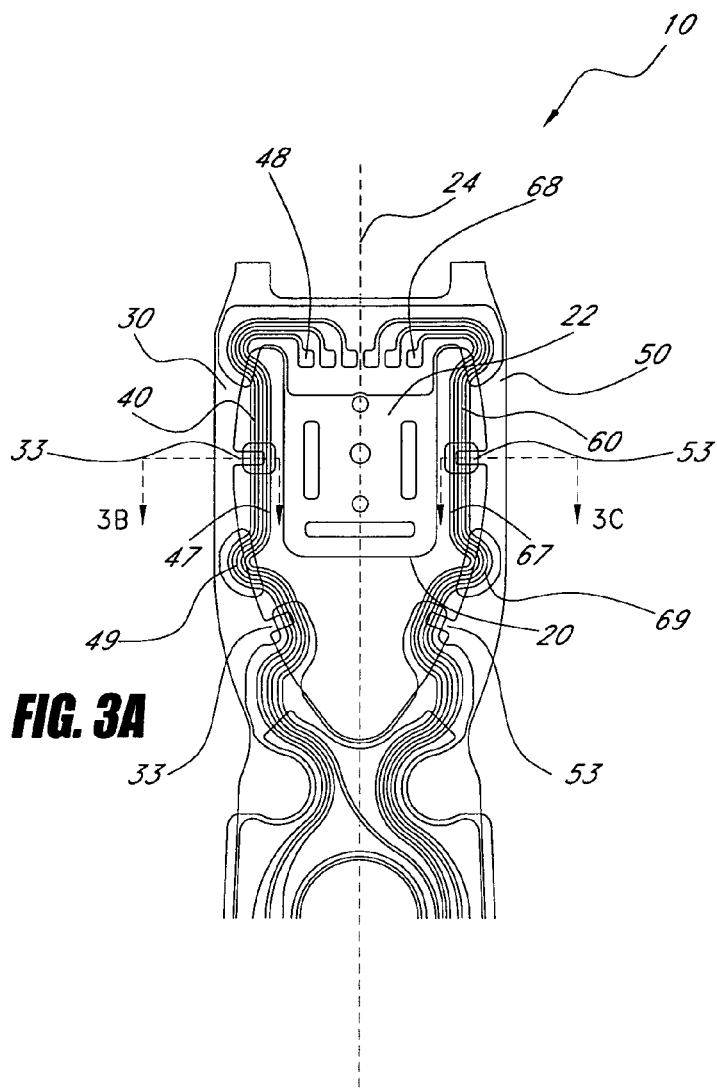
FIG. 3A schematically illustrates a third example flexure for supporting a head in a disk drive in accordance with certain embodiments described herein.
Figure 3B:
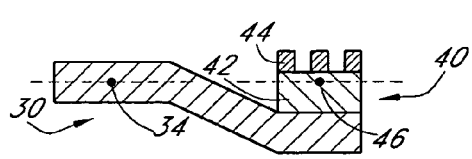
FIG. 3B schematically illustrates a cross-sectional view of a portion of a first arm and a portion of a second arm of the example flexure of FIG. 3A.
Figure 3C:
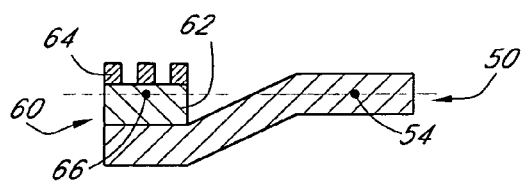
FIG. 3C schematically illustrates a cross-sectional view of a portion of a third arm and a portion of a fourth arm of the example flexure of FIG. 3A.

In certain embodiments, the structural material of the first arm 30 comprises steel (e.g., stainless steel), while in certain other embodiments, other structural materials (e.g., metals, various ceramics, etc.) may be used. The first arm 30 of certain embodiments has a generally elongate shape and extends along a first side of the tongue 20, as schematically illustrated by FIG. 1A. In certain embodiments, the first arm 30 is substantially straight while in other embodiments, the first arm 30 is curved or has one or more angles along its length. For example, as schematically illustrated in FIG. 1A, the first arm 30 has a curve or non-zero angle at a region 32 along the length of the first arm 30. In certain embodiments, the first arm 30 is substantially planar, while in other embodiments, the first arm 30 has two or more portions which are non-planar with one another. As schematically illustrated by FIG. 3A, the first arm 30 of certain embodiments comprises one or more extensions 33 (e.g., tabs) that are mechanically coupled to corresponding portions of the second arm 40.

In certain embodiments, the first arm 30 has a generally rectangular first cross-sectional area, as schematically illustrated by FIG. 1B, while other cross-sectional area shapes are also compatible with various embodiments described herein. In certain embodiments, the first cross-sectional area of the first arm 30 is substantially constant along the length of the first arm 30, while in other embodiments, the first cross-sectional area of the first arm 30 varies along the length of the first arm 30. For example, the width of the first arm 30 can vary along the length of the first arm 30, as schematically illustrated by FIG. 1A, or the thickness of the first arm 30 can vary along the length of the first arm 30. The first arm 30 of certain embodiments has a thickness no less than 10 microns.

The first cross-sectional area of the first arm 30 in a plane perpendicular to the head mounting surface 22 has a first centroid 34, as schematically illustrated by FIG. 1B. As used herein, the term "first centroid" is used in its broadest sense, including but not limited to, the geometric center of the first cross-sectional area. In certain embodiments, the first centroid is the geometric center of the smallest quadrangle that bounds the first cross-sectional area. In certain embodiments in which the first arm 30 has a uniform density, the first centroid 34 of the first cross-sectional area coincides with the center of mass of the first cross-sectional area.

As schematically illustrated by FIGS. 1A-1C, 2A-2C, 3A-3C, and 4A-4C, the second arm 40 comprises the conductive material layer 44 and a dielectric material layer 42 (e.g., a support layer for the conductive material layer 44). In certain embodiments, the dielectric material layer 42 of the second arm 40 comprises polyimide or Kapton®, while in certain other embodiments, other dielectric materials capable of being etched may be used. In certain embodiments, the dielectric material layer 42 has a thickness in a range between about 5 microns and about 20 microns.

In certain embodiments, the conductive material layer 44 of the second arm 40 comprises copper or aluminum. In certain embodiments, the conductive material layer 44 further comprises a gold plating layer or a nickel layer that provides improved protection against corrosion of the conductive material layer 44. In certain other embodiments, other conductive materials may be used. In certain embodiments, the conductive material layer 44 has a thickness in a range between about 5 microns and about 20 microns.

In certain embodiments, the conductive material layer 44 comprises a plurality of electrically conductive conduits 47 that are substantially isolated from one another and that extend along the length of the second arm 40, as schematically illustrated by FIG. 1A. These electrically conductive conduits 47 each have one or more electrical contacts 48 on or in proximity to the tongue 20 and which are configured to be electrically coupled to corresponding electrical contacts of the head when mounted to the head mounting surface 22. In certain embodiments, the conductive material layer 44 comprises three electrically conductive conduits 47, as schematically illustrated by FIG. 1A. In certain other embodiments, the conductive material layer 44 comprises one, two, four, five, six, or other number of electrically conductive conduits 47.

Figure 5A:
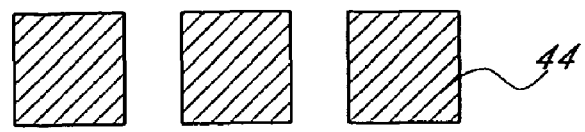
FIGS. 5A-5D schematically illustrate cross-sectional views of various embodiments of the second arm in accordance with certain embodiments described herein.
Figure 5B:
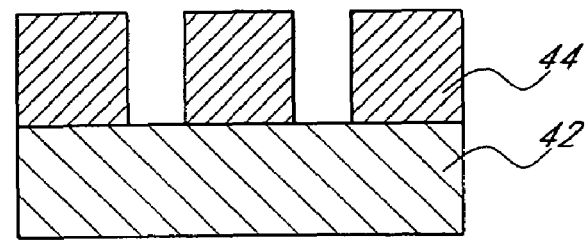
Figure 5C:
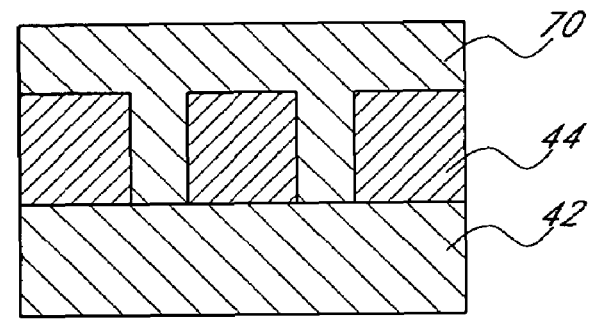
Figure 5D:
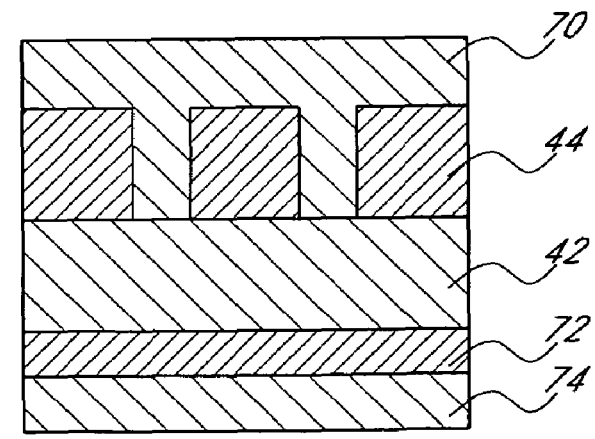

In certain other embodiments, the second arm 40 comprises only the conductive material layer 44, as schematically illustrated by FIG. 5A. FIG. 5B schematically illustrates a second arm 40 comprising the conductive material layer 44 and a dielectric material layer 42. In certain other embodiments, the second arm 40 comprises the conductive material layer 44, a first dielectric material layer 42 (e.g., serving as a support layer) on a first side of the conductive material layer 44, and a second dielectric material layer 70 (e.g., serving as a cover layer) on a second side of the conductive material layer 44, as schematically illustrated by FIG. 5C. The second dielectric material layer 70 of certain such embodiments comprises a polymer (e.g., polyimide) and has a thickness in a range between about 3 microns and about 20 microns. In still other certain embodiments, the second arm 40 comprises the conductive material layer 44, first and second dielectric material layers 42, 70 (e.g., serving as a support layer and as a cover layer), a second conductive layer 72 electrically isolated from the conductive material layer 44 (e.g., serving as a ground plane), and a third dielectric material layer 74 (e.g., serving as a cover layer for the second conductive layer 72). The second conductive layer 72 of certain such embodiments comprises copper and has a thickness in a range between about 0.5 micron and about 5 microns. The third dielectric material layer 74 of certain such embodiments comprises a polymer (e.g., polyimide) and has a thickness in a range between about 1 micron and about 10 microns.

The second arm 40 of certain embodiments has a generally elongate shape and extends along the first side of the tongue 20, as schematically illustrated by FIG. 1A. In certain embodiments, the second arm 40 is substantially straight while in other embodiments, the second arm 40 is curved or has one or more angles along its length. In certain embodiments, the second arm 40 is substantially planar, while in other embodiments, the second arm 40 has two or more portions which are non-planar with one another. In certain embodiments, the second arm 40 is substantially parallel to the first arm 30.

In certain embodiments, the second arm 40 has a generally rectangular second cross-sectional area, as schematically illustrated by FIG. 1B, while other cross-sectional area shapes are also compatible with various embodiments described herein. In certain embodiments, the second cross-sectional area of the second arm 40 is substantially constant along the length of the second arm 40, while in other embodiments, the second cross-sectional area of the second arm 40 varies along the length of the second arm 40. For example, the width of the second arm 40 can vary along the length of the second arm 40, or the thickness of the second arm 40 can vary along the length of the second arm 40. In certain embodiments in which the second arm 40 comprises only the conductive material layer 44, the second arm 40 has a thickness of no less than 5 microns. In certain embodiments in which the second arm 40 comprises the conductive material layer 44 and the dielectric material layer 42, the second arm 40 has a thickness of no less than 10 microns.

The second cross-sectional area of the second arm 40 in a plane perpendicular to the head mounting surface 22 has a second centroid 46, as schematically illustrated by FIG. 1B. As used herein, the term "second centroid" is used in its broadest sense, including but not limited to, the geometric center of the second cross-sectional area. In certain embodiments, the second centroid is the geometric center of the smallest quadrangle that bounds the second cross-sectional area. For example, as schematically illustrated by FIG. 1B, the second centroid 46 is the geometric center of a rectangle which bounds the second cross-sectional area. In certain embodiments in which the second arm 40 has a uniform density, the second centroid 46 of the second cross-sectional area coincides with the center of mass of the second cross-sectional area.

Figure 2A:
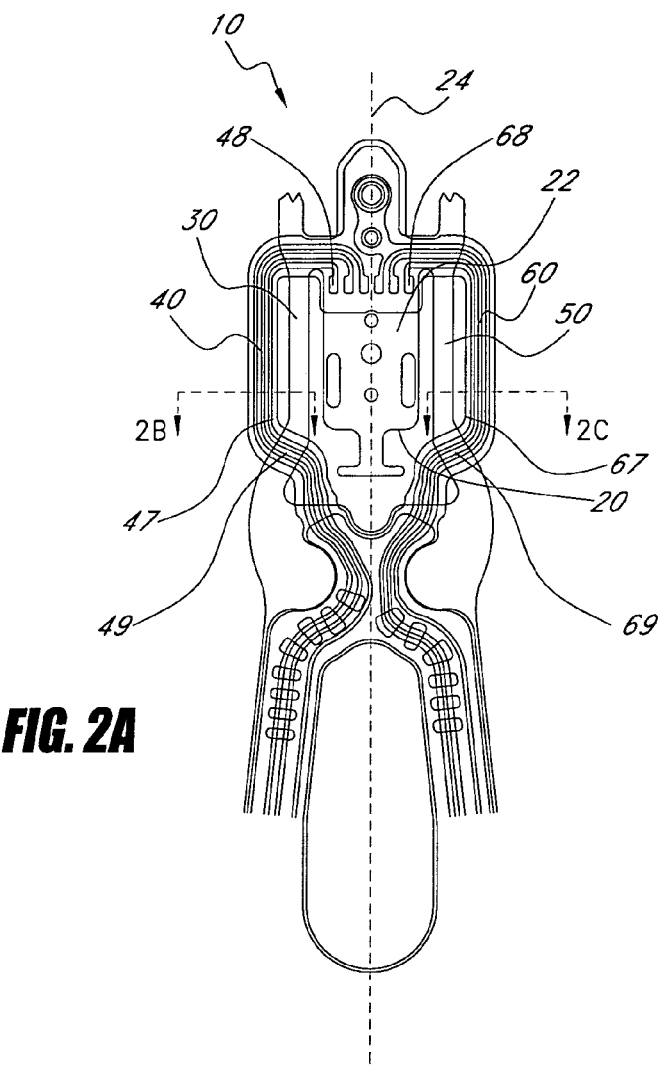
FIG. 2A schematically illustrates a second example flexure for supporting a head in a disk drive in accordance with certain embodiments described herein.
Figure 2B:
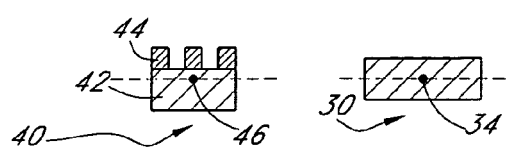
FIG. 2B schematically illustrates a cross-sectional view of a portion of a first arm and a portion of a second arm of the example flexure of FIG. 2A.
Figure 2C:
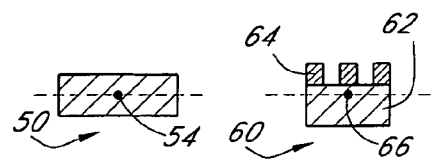
FIG. 2C schematically illustrates a cross-sectional view of a portion of a third arm and a portion of a fourth arm of the example flexure of FIG. 2A.
Figure 4A:
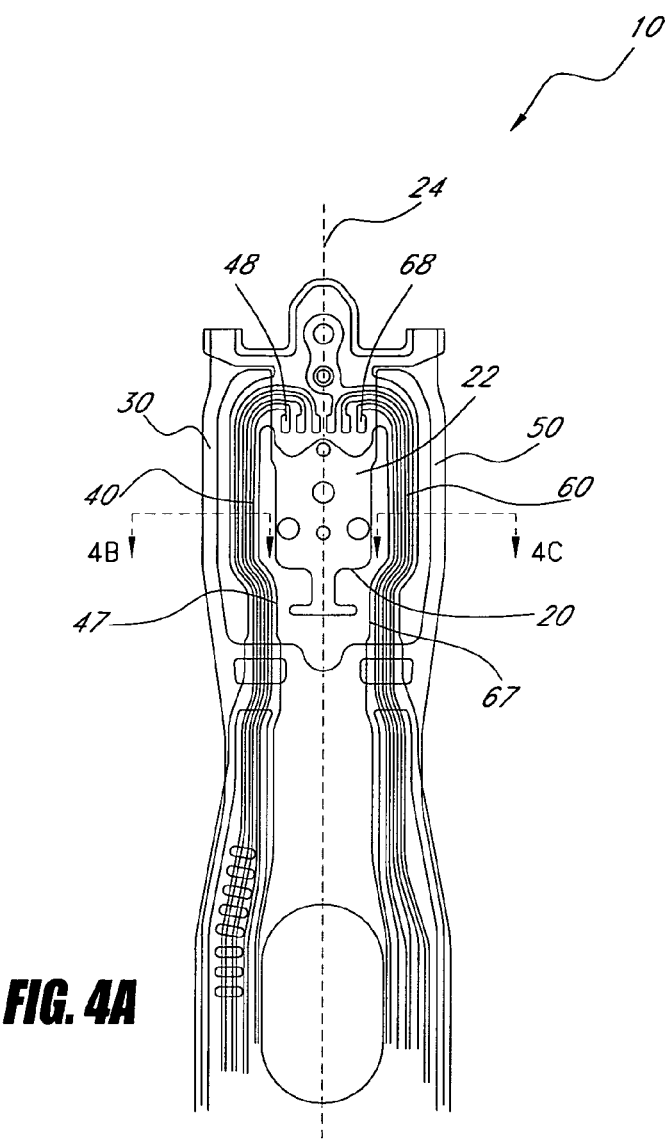
FIG. 4A schematically illustrates a fourth example flexure for supporting a head in a disk drive in accordance with certain embodiments described herein.
Figure 4B:
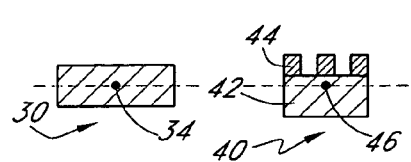
FIG. 4B schematically illustrates a cross-sectional view of a portion of a first arm and a portion of a second arm of the example flexure of FIG. 4A.
Figure 4C:
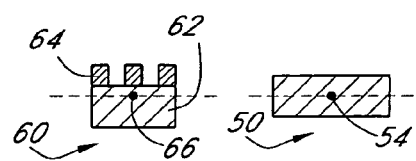
FIG. 4C schematically illustrates a cross-sectional view of a portion of a third arm and a portion of a fourth arm of the example flexure of FIG. 4A.

In certain embodiments, as schematically illustrated by FIG. 1A, the first arm 30 is closer to the tongue 20 than is the second arm 40, and the first arm 30 and the second arm 40 do not cross or overlap one another. In certain embodiments, the first arm 30 is closer to the tongue 20 than is the second arm 40, and the first arm 30 and the second arm 40 cross at one or more regions 49, as schematically illustrated by FIG. 2A. In certain embodiments, as schematically illustrated by FIG. 4A, the first arm 30 is farther from the tongue 20 than is the second arm 40 and the first arm 30 and the second arm 40 do not cross or overlap one another. In certain embodiments, the first arm 30 is farther from the tongue 20 than is the second arm 40, and the first arm 30 and the second arm 40 cross at one or more regions 49, as schematically illustrated by FIG. 3A.

As schematically illustrated by FIG. 1B, in certain embodiments, the first centroid 34 of the first cross-sectional area of the first arm 30 is substantially aligned with the second centroid 46 of the second cross-sectional area of the second arm 40. In certain embodiments, the second centroid 46 is not offset by more than 10 microns from the first centroid 34 in a direction perpendicular to the head mounting surface 22. In certain other embodiments, the second centroid 46 is not offset by more than 6 microns from the first centroid 34 in a direction perpendicular to the head mounting surface 22. In still other embodiments, the second centroid 46 is not offset by more than 3 microns from the first centroid 34 in a direction perpendicular to the head mounting surface 22.

In certain embodiments, the flexure 10 further comprises a third arm 50 on a second side of the tongue 20 and a fourth arm 60 on the second side of the tongue 20, as schematically illustrated by FIG. 1A. In certain embodiments, the third arm 50 has a third cross-sectional area in a plane perpendicular to the head mounting surface 22 and the fourth arm 60 has a fourth cross-sectional area in a plane perpendicular to the head mounting surface 22.

In certain embodiments, the structural material of the third arm 50 comprises steel (e.g., stainless steel), while in certain other embodiments, other structural materials (e.g., metals, various ceramics, etc.) may be used. The third arm 50 of certain embodiments has a generally elongate shape and extends along a second side of the tongue 20, as schematically illustrated by FIG. 1A. In certain embodiments, the third arm 50 is substantially straight while in other embodiments, the third arm 50 is curved or has one or more angles along its length. For example, as schematically illustrated in FIG. 1A, the third arm 50 has a curve or non-zero angle at a point 52 along the length of the third arm 50. In certain embodiments, the third arm 50 is substantially planar, while in other embodiments, the third arm 50 has two or more portions which are non-planar with one another. As schematically illustrated by FIG. 3A, the third arm 50 of certain embodiments comprises one or more extensions 53 (e.g., tabs) that are mechanically coupled to corresponding portions of the fourth arm 60.

In certain embodiments, the third arm 50 has a generally rectangular third cross-sectional area, as schematically illustrated by FIG. 1C, while other cross-sectional area shapes are also compatible with various embodiments described herein. In certain embodiments, the third cross-sectional area of the third arm 50 is substantially constant along the length of the third arm 50, while in other embodiments, the third cross-sectional area of the third arm 50 varies along the length of the third arm 50. For example, the width of the third arm 50 can vary along the length of the third arm 50, as schematically illustrated by FIG. 1A, or the thickness of the third arm 50 can vary along the length of the third arm 50. The third arm 50 of certain embodiments has a thickness no less than 10 microns.

The third cross-sectional area of the third arm 50 in a plane perpendicular to the head mounting surface 22 has a third centroid 54, as schematically illustrated by FIG. 1C. As used herein, the term "third centroid" is used in its broadest sense, including but not limited to, the geometric center of the third cross-sectional area. In certain embodiments, the third centroid is the geometric center of the smallest quadrangle that bounds the third cross-sectional area. In certain embodiments in which the third arm 50 has a uniform density, the third centroid 54 of the third cross-sectional area coincides with the center of mass of the third cross-sectional area.

In certain embodiments, the fourth arm 60 comprises a dielectric material layer 62 and a conductive material layer 64. In certain embodiments, the dielectric material layer 62 of the fourth arm 60 comprises polyimide or Kapton®, while in certain other embodiments, other dielectric materials capable of being etched may be used. In certain embodiments, the dielectric material layer 62 has a thickness in a range between about microns and about 20 microns.

In certain embodiments, the conductive material layer 64 of the fourth arm 60 comprises copper or aluminum. In certain embodiments, the conductive material layer 64 further comprises a gold plating layer or a nickel layer that provides improved protection against corrosion of the conductive material layer 64. In certain other embodiments, other conductive materials may be used. In certain embodiments, the conductive material layer 64 has a thickness in a range between about 5 microns and about 20 microns.

In certain embodiments, the conductive material layer 64 comprises a plurality of electrically conductive conduits 67 that are substantially isolated from one another and that extend along the length of the fourth arm 60, as schematically illustrated by FIG. 1A. These electrically conductive conduits 67 each have one or more electrical contacts 68 on or in proximity to the tongue 20 and which are configured to be electrically coupled to corresponding electrical contacts of the head when mounted to the head mounting surface 22. In certain embodiments, the conductive material layer 64 comprises three electrically conductive conduits 67, as schematically illustrated by FIG. 1A. In certain other embodiments, the conductive material layer 64 comprises one, two, four, five, six, or other number of electrically conductive conduits 67.

In certain other embodiments, the fourth arm 60 comprises (i) only the conductive material layer 64, (ii) the conductive material layer 64 and a dielectric material layer 62, (iii) the conductive material layer 64, a first dielectric material layer 62 (e.g., serving as a support layer) on a first side of the conductive material layer 64, and a second dielectric material layer (e.g., serving as a cover layer) on a second side of the conductive material layer 44, or (iv) the conductive material layer 64, first and second dielectric material layers (e.g., serving as a support layer and as a cover layer), a second conductive layer electrically isolated from the conductive material layer 64 (e.g., serving as a ground plane), and a third dielectric material layer (e.g., serving as a cover layer for the second conductive layer). The second dielectric material layer of certain embodiments comprises a polymer (e.g., polyimide) and has a thickness in a range between about 3 microns and about 20 microns. The second conductive layer of certain embodiments comprises copper and has a thickness in a range between about 0.5 micron and about 5 microns. The third dielectric material layer of certain embodiments comprises a polymer (e.g., polyimide) and has a thickness in a range between about 1 micron and about 10 microns.

The fourth arm 60 of certain embodiments has a generally elongate shape and extends along the second side of the tongue 20, as schematically illustrated by FIG. 1A. In certain embodiments, the fourth arm 60 is substantially straight while in other embodiments, the fourth arm 60 is curved or has one or more angles along its length. In certain embodiments, the fourth arm 60 is substantially planar, while in other embodiments, the fourth arm 60 has two or more portions which are non-planar with one another. In certain embodiments, the fourth arm 60 is substantially parallel to the third arm 50.

In certain embodiments, the fourth arm 60 has a generally rectangular fourth cross-sectional area, as schematically illustrated by FIG. 1C, while other cross-sectional area shapes are also compatible with various embodiments described herein. In certain embodiments, the fourth cross-sectional area of the fourth arm 60 is substantially constant along the length of the fourth arm 60, while in other embodiments, the fourth cross-sectional area of the fourth arm 60 varies along the length of the fourth arm 60. For example, the width of the fourth arm 60 can vary along the length of the fourth arm 60, or the thickness of the fourth arm 60 can vary along the length of the fourth arm 60. In certain embodiments in which the fourth arm 60 comprises only the conductive material layer 64, the fourth arm 60 has a thickness of no less than 5 microns. In certain embodiments in which the fourth arm 60 comprises the conductive material layer 64 and the dielectric material layer 62, the fourth arm 60 has a thickness no less than 10 microns.

The fourth cross-sectional area of the fourth arm 60 in a plane perpendicular to the head mounting surface 22 has a fourth centroid 66, as schematically illustrated by FIG. 1C. As used herein, the term "fourth centroid" is used in its broadest sense, including but not limited to, the geometric center of the fourth cross-sectional area. In certain embodiments, the fourth centroid is the geometric center of the smallest quadrangle that bounds the fourth cross-sectional area. For example, as schematically illustrated by FIG. 1C, the fourth centroid 66 is the geometric center of a rectangle which bounds the fourth cross-sectional area. In certain embodiments in which the fourth arm 60 has a uniform density, the fourth centroid 66 of the fourth cross-sectional area coincides with the center of mass of the fourth cross-sectional area.

In certain embodiments, as schematically illustrated by FIG. 1A, the third arm 50 is closer to the tongue 20 than is the fourth arm 60, and the third arm 50 and the fourth arm 60 do not cross or overlap one another. In certain embodiments, the third arm 50 is closer to the tongue 20 than is the fourth arm 60, and the third arm 50 and the fourth arm 60 cross at one or more regions 69, as schematically illustrated by FIG. 2A. In certain embodiments, as schematically illustrated by FIG. 4A, the third arm 50 is farther from the tongue 20 than is the fourth arm 60 and the third arm 50 and the fourth arm 60 do not cross or overlap one another. In certain embodiments, the third arm 50 is farther from the tongue 20 than is the fourth arm 60, and the third arm 50 and the fourth arm 60 cross at one or more regions 69, as schematically illustrated by FIG. 3A.

As schematically illustrated by FIG. 1C, in certain embodiments, the third centroid 54 of the third cross-sectional area of the third arm 50 is substantially aligned with the fourth centroid 66 of the fourth cross-sectional area of the fourth arm 60. In certain embodiments, the fourth centroid 66 is not offset by more than 10 microns from the third centroid 54 in a direction perpendicular to the head mounting surface 22. In certain other embodiments, the fourth centroid 66 is not offset by more than 6 microns from the third centroid 54 in a direction perpendicular to the head mounting surface 22. In still other embodiments, the fourth centroid 66 is not offset by more than 3 microns from the third centroid 54 in a direction perpendicular to the head mounting surface 22.

In certain embodiments, the first centroid 34, the second centroid 46, the third centroid 54, and the fourth centroid 66 are substantially aligned with one another. For example, in certain embodiments, the first centroid 34, the second centroid 46, the third centroid 54, and the fourth centroid 66 are not offset by more than 10 microns from one another in a direction perpendicular to the head mounting surface 22. In certain other embodiments, the first centroid 34, the second centroid 46, the third centroid 54, and the fourth centroid 66 are not offset by more than 6 microns from one another in a direction perpendicular to the head mounting surface 22. In still other embodiments, the first centroid 34, the second centroid 46, the third centroid 54, and the fourth centroid 66 are not offset by more than 3 microns from one another in a direction perpendicular to the head mounting surface.

FIGS. 6A-6E schematically illustrate cross-sectional views of a sequence of structures produced during the fabrication of a conventional flexure. As schematically illustrated by FIG. 6A, a first layer 80 comprising a structural material (e.g., stainless steel) is provided. As schematically illustrated by FIG. 6B, a second layer 90 comprising an electrically insulating material (e.g., polyimide) is formed on the first layer 80. As schematically illustrated by FIG. 6C, a third layer 100 comprising an electrically conductive material (e.g., copper) is formed on the second layer 90 and is patterned to form electrical conduits 47. As schematically illustrated by FIG. 6D, a portion of the first layer 80 is removed (e.g., etched) from below the second layer 90, thereby forming the first arm 30 and the second arm 40. As schematically illustrated by FIG. 6E, the first centroid 34 of the first arm 30 and the second centroid 46 of the second arm 40 are substantially offset (e.g., by more than 10 microns) from one another along a direction substantially perpendicular to the head mounting surface 22.

FIGS. 7A-7F schematically illustrate cross-sectional views of a sequence of structures produced during the fabrication of a flexure 10 in accordance with certain embodiments described herein. As schematically illustrated by FIG. 7A, a substrate 110 is provided, and a first layer 120 comprising a structural material (e.g., stainless steel) is formed over a first portion of the substrate 110 and a second layer 130 comprising an electrically insulating material (e.g., polyimide) is formed over a second portion of the substrate 110 laterally spaced from the first portion of the substrate 110.

As schematically illustrated by FIGS. 7A and 7B, in certain embodiments, the first layer 120 is formed over the first and second portions of the substrate 110 and the structural material is removed (e.g., by etching) from the second portion of the substrate 110. As schematically illustrated by FIG. 7C, the second layer 130 is formed over the second portion of the substrate 110. In certain other embodiments, the second layer 130 is formed over the first and second portions of the substrate 110, the electrically insulating material is removed (e.g., by etching) from the first portion of the substrate 110, and the first layer 120 is formed on the first portion of the substrate 110.

As schematically illustrated by FIG. 7D, a third layer 140 comprising an electrically conductive material (e.g., copper) is formed over the second layer 130 and is patterned to form electrical conduits 47. In certain embodiments in which the second arm 40 comprises an electrically conductive material and an electrically insulating material, forming the third layer 140 comprises depositing the electrically conductive material over the first portion of the substrate 110 and the second portion of the substrate 110, and removing the electrically conductive material from the first portion of the substrate 110. In certain such embodiments, removing the electrically conductive material from the first portion of the substrate 110 comprises etching the electrically conductive material. In certain embodiments in which the second arm 40 comprises only the electrically conductive material, the electrically conductive material of the third layer 140 is deposited over the substrate 110 without an intervening layer of electrically insulating material.

As schematically illustrated by FIG. 7E, the substrate 110 is removed (e.g., by etching or by peeling away), thereby forming the first arm 30 and the second arm 40. In certain embodiments in which the substrate 110 is etched from the first arm 30 and the second arm 40, the substrate 110 comprises an etchable material (e.g., ceramic, silicon). In certain other embodiments in which the substrate 110 is peeled away from the first arm 30 and the second arm 40, the substrate 110 comprises a suitable material (e.g., stainless steel). Other process steps and sequences of process steps are also compatible with various embodiments described herein. As schematically illustrated by FIG. 7F, the first centroid 34 of the first arm 30 and the second centroid 46 of the second arm 40 are not offset from one another by more than a predetermined distance (e.g., 10 microns) along a direction substantially perpendicular to the head mounting surface 22.

In certain embodiments, the flexure 10 is formed by deforming one or more portions of a flexure fabricated using a conventional process. Using a conventional process (e.g., the process schematically illustrated by FIGS. 6A-6E), a flexure 10 to be deformed is provided. The flexure 10 is placed on a first portion of a forming tool (not shown), and is plastically deformed by pressing a second portion of the forming tool against the first portion of the forming tool such that the flexure 10 is sandwiched between the first and second portions of the forming tool. In certain embodiments, the flexure 10 is held in place at two positions along an arm to be plastically deformed, and the portion of the arm between the two positions is pressed so as to plastically deform the arm.

Figure 8A:
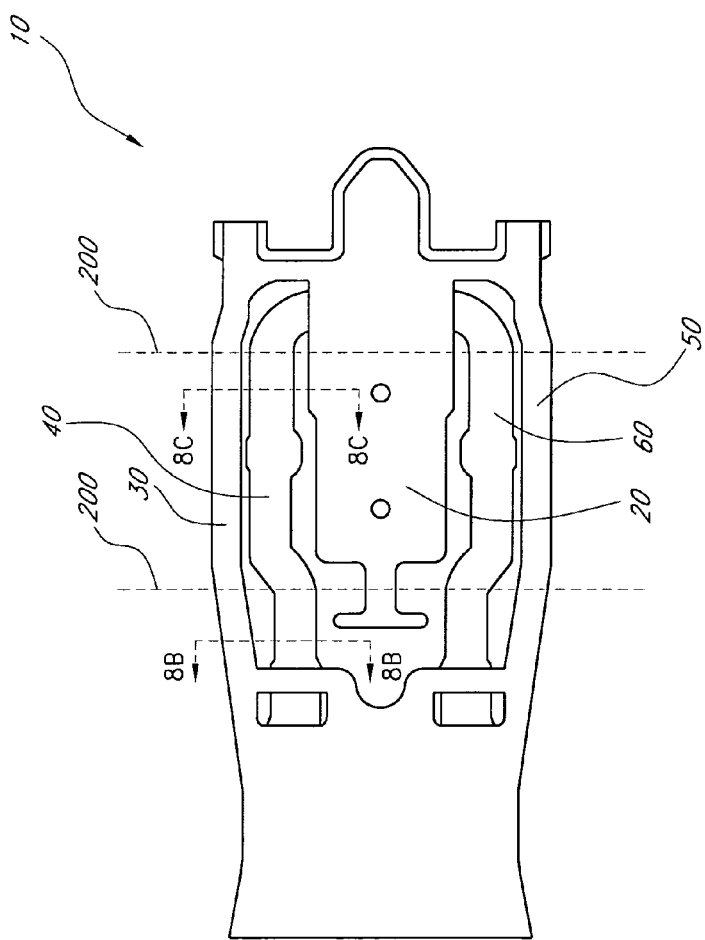
FIGS. 8A-8C schematically illustrate an example flexure fabricated by plastically deforming a portion of the second arm and a portion of the fourth arm in accordance with certain embodiments described herein.
Figure 8C:
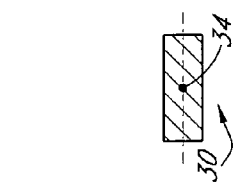
Figure 8B:
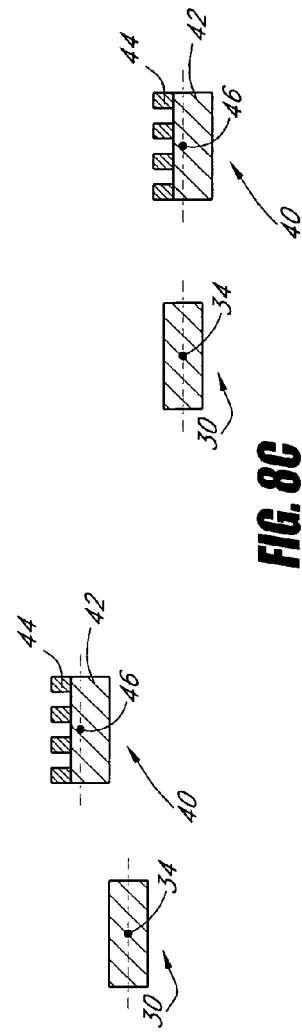

In certain embodiments, at least one of the first arm 30 and the second arm 40 is deformed such that the second centroid 46 is not offset from the first centroid 34 by more than 10 microns in a direction perpendicular to the head mounting surface. In certain embodiments, at least one of the third arm 50 and the fourth arm 60 is deformed such that the fourth centroid 66 is not offset from the third centroid 54 by more than 10 microns in a direction perpendicular to the head mounting surface, by more than 6 microns in a direction perpendicular to the head mounting surface, or by more than 3 microns in a direction perpendicular to the head mounting surface. FIGS. 8A-8C schematically illustrate an example flexure 10 fabricated by plastically deforming the second arm 40 and the fourth arm 60 such that a portion of the second arm 40 and a portion of the fourth arm 60 between the lines 200 are displaced by a predetermined amount (e.g., by about 0.02 millimeters) in a direction substantially perpendicular to the head mounting surface 22. FIG. 8A schematically illustrates the flexure 10 from a direction substantially perpendicular to the head mounting surface 22. FIG. 8B schematically illustrates a cross-sectional view of a portion of the flexure 10 that is not displaced by the deformation process and FIG. 8C schematically illustrates a cross-sectional view of a portion of the flexure 10 that is displaced by the deformation process.

In the portion of the flexure 10 that is not displaced, the centroids of the first arm 30 and the second arm 40 in a plane substantially perpendicular to the head mounting surface 22 are substantially offset from one another in a direction substantially perpendicular to the head mounting surface 22, and the centroids of the third arm 50 and the fourth arm 60 in a plane substantially perpendicular to the head mounting surface 22 are substantially offset from one another in a direction substantially perpendicular to the head mounting surface 22. In the displaced portion of the flexure 10, the centroids of the first arm 30 and the second arm 40 in a plane substantially perpendicular to the head mounting surface 22 are not offset from one another by more than 10 microns in a direction substantially perpendicular to the head mounting surface 22, by more than 6 microns in a direction perpendicular to the head mounting surface, or by more than 3 microns in a direction perpendicular to the head mounting surface, and the centroids of the third arm 50 and the fourth arm 60 in a plane substantially perpendicular to the head mounting surface 22 are not offset from one another by more than 10 microns in a direction substantially perpendicular to the head mounting surface 22, by more than 6 microns in a direction perpendicular to the head mounting surface, or by more than 3 microns in a direction perpendicular to the head mounting surface. In an exemplary embodiment, the deformation process reduces the pitch stiffness of the flexure 10 by about 35% (e.g., from 0.539 micronewton-meter per degree to 0.350 micronewton-meter per degree) and does not appreciably reduce the roll stiffness of the flexure 10 (e.g., from 0.564 micronewton-meter per degree to 0.562 micronewton-meter per degree).

FIGS. 9A-9C schematically illustrate an example flexure 10 in which the first arm 30 comprises one or more (e.g., two) extensions 33 extending generally toward the second arm 40 and mechanically coupled to corresponding portions of the second arm 40 and in which the third arm 50 comprises one or more (e.g., two) extensions 53 extending generally toward the fourth arm 60 and mechanically coupled to corresponding portions of the fourth arm 60. In certain embodiments, the extensions 33, 53 have a length between about 0.1 millimeter and about 0.3 millimeter, a width between about 0.05 millimeter and about 0.2 millimeter, and a thickness between about 12 microns and about 25 microns.

While the extensions 33, 53 of FIG. 9A have a substantially rectangular shape, other shapes are also compatible with various embodiments described herein. In addition, in certain embodiments, the first arm 30 comprises a single extension 33 or more than two extensions 33, and the third arm 50 comprises a single extension 53 or more than two extensions 53.

The flexure 10 of FIGS. 9A-9C is fabricated by plastically deforming the extensions 33, 53, the second arm 40, and the fourth arm 60 such that a portion of the second arm 40 and a portion of the fourth arm 60 between the lines 200 are displaced by a predetermined amount in a direction substantially perpendicular to the head mounting surface 22. FIG. 9A schematically illustrates the flexure 10 from a direction substantially perpendicular to the head mounting surface 22. FIG. 9B schematically illustrates a cross-sectional view of a portion of the flexure 10 that includes the deformed extension 33 and FIG. 9C schematically illustrates a cross-sectional view of a portion of the flexure 10 between the lines 200.

In certain embodiments, the deformations are sufficient such that the first centroid 34 and the second centroid 46 of the portions of the first arm 30 and the second arm 40 between the lines 200 are not substantially offset from one another in a direction substantially perpendicular to the head mounting surface 22. In certain embodiments, the deformations are sufficient such that the third centroid 54 and the fourth centroid 66 of the portions of the third arm 50 and the fourth arm 60 between the lines 200 are not substantially offset from one another in a direction substantially perpendicular to the head mounting surface 22.

In the example flexures 10 of FIGS. 8A-8C and 9A-9C, the first arm 30 comprises a substantially planar first portion between the lines 200 and the second arm 40 comprises a substantially planar second portion between the lines 200 that is substantially co-planar with the first portion. In certain embodiments, the first portion and the second portion are configured to flex in a flexing direction substantially perpendicular to the first and second arms 30, 40, and the second portion is substantially co-planar with the first portion in a plane substantially perpendicular to the flexing direction.

In certain embodiments, the second arm 40 comprises one or more extensions extending generally toward the first arm 30 and mechanically coupled to the first arm 30. In certain embodiments, the first arm 30 comprises one or more extensions extending generally toward the second arm 40, and the second arm 40 comprises one or more extensions extending generally toward the first arm 30. The one or more extensions of the first arm 30 in certain such embodiments are mechanically coupled to the one or more extensions of the second arm 40. In certain embodiments, the fourth arm 60 comprises one or more extensions extending generally toward the third arm 50 and mechanically coupled to the third arm 50. In certain embodiments, the third arm 50 comprises one or more extensions extending generally toward the fourth arm 60, and the fourth arm 60 comprises one or more extensions extending generally toward the third arm 50. The one or more extensions of the third arm 50 in certain such embodiments are mechanically coupled to the one or more extensions of the fourth arm 60.

Certain embodiments described herein advantageously provide sufficient lateral stiffness with lower flexure stiffness values in selected directions (e.g., pitch stiffness and/or roll stiffness) that are useful for disk drives with increased tracks per inch and storage density. In certain embodiments, the flexure 10 has a pitch stiffness less than 0.4 micronewton-meter per degree. In certain embodiments, the flexure has a roll stiffness less than 0.4 micronewton-meter per degree.

Pitch movement of the head creates stresses and strains in the first arm 30, the second arm 40, the third arm 50, and the fourth arm 60. The reduced pitch stiffness of the flexure 10 of certain embodiments described herein can be attributed to a shifting of one or both of the neutral axes of the first arm 30 and the second arm 40 toward one another and to a shifting of one or both of the neutral axes of the third arm 50 and the fourth arm 60 toward one another. The neutral axis of an arm is a line along which the arm experiences neither tension nor compressive stresses upon flexing of the arm in a direction substantially perpendicular to the neutral axis.

The second moment of area of a shape about an axis is a property of the shape that is predictive of its resistance to bending and deflection. The second moment of area of a rectangular structure about the x-axis can be expressed as:

$I_x = \int y^2 dA = bh^3/12$, where $I_x$ is the second moment of area about the x-axis, dA is the elemental area, y is the perpendicular distance to the element dA from the x-axis, b is the width or x-dimension of the rectangle, and h is the height or y-dimension of the rectangle. Thus, the stiffness of an arm having a rectangular cross-sectional area varies as the cube of the height of the arm along the direction of deflection.

The decrease of the pitch stiffness of certain embodiments of the flexure 10 described herein can be expressed using the parallel axis theorem: $I_x = I_{CG} + Ad^2$, where $I_x$ is the second moment of area with respect to the x-axis, $I_{CG}$ is the second moment of area with respect to an axis parallel to the x-axis and passing through the centroid of the cross-sectional area (which, for shapes having uniform density, corresponds to the center-of-gravity), A is the cross-sectional area, and d is the offset distance between the x-axis and the centroidal axis.

FIG. 10A depicts a cross-section of a prior art flexure having a first arm 30 and a second arm 40 with a substantial offset between the first centroid 34 and the second centroid 46. The total second moment of area of the cross-section of the prior art flexure, about an axis that is parallel to the x-axis and passing through the first centroid 34, is: $I_{total} = I_{30CG} + I_{40CG} + A_{40}d^2$, where $I_{30CG}$ is the second moment of the cross-sectional area of the first arm 30 about its own centroid, $I_{40CG}$ is the second moment of the cross-sectional area of the second arm 40 about its own centroid, $A_{40}$ is the cross-sectional area of the second arm 40, and d is the offset distance between the first centroid 34 and the second centroid 46.

In contrast, FIG. 10B depicts a cross-section of a flexure according to an embodiment of the present invention, in which there the offset between the first centroid 34 and the second centroid 46 is reduced, for example to zero. The total second moment of area of this example cross-section, about an axis that is parallel to the x-axis and passing through the first centroid 34 is: $I_{total} = I_{30CG} + I_{40CG}$. Thus, eliminating the offset reduces the flexure stiffness by an amount proportional to the square of the offset distance d.

What is claimed is:

1. A flexure for supporting a head in a disk drive, the flexure comprising:
   a tongue including a head mounting surface for attaching the head;
   a first arm on a first side of the tongue, the first arm comprising a structural material and having a first cross-sectional area in a plane perpendicular to the head mounting surface, the first cross-sectional area having a first centroid; and
   a second arm on the first side of the tongue, the second arm comprising a layer of conductive material that is not the same as the structural material, the second arm not comprising any layer of the structural material, the second arm having a second cross-sectional area in the plane perpendicular to the head mounting surface, the second cross-sectional area having a second centroid, wherein the second centroid is not offset from the first centroid by more than 10 microns in a direction perpendicular to the head mounting surface.

2. A flexure for supporting a head in a disk drive, the flexure comprising:
   a tongue including a head mounting surface for attaching the head;
   a first arm on a first side of the tongue, the first arm comprising a structural material and having a first cross-sectional area in a plane perpendicular to the head mounting surface, the first cross-sectional area having a first centroid; and
   a second arm on the first side of the tongue, the second arm comprising a layer of conductive material that is not the same as the structural material, the second arm having a second cross-sectional area in the plane perpendicular to the head mounting surface, the second cross-sectional area having a second centroid, wherein the second centroid is not offset from the first centroid by more than 10 microns in a direction perpendicular to the head mounting surface,
   wherein the first arm has a thickness no less than 10 microns and the second arm has a thickness no less than 5 microns.

3. The flexure of claim 2, wherein the flexure has a pitch stiffness less than 0.4 micronewton-meter per degree.

4. The flexure of claim 2, wherein the flexure has a roll stiffness less than 0.4 micronewton-meter per degree.

5. The flexure of claim 1, wherein the second arm is substantially parallel to the first arm.

6. A flexure for supporting a head in a disk drive, the flexure comprising:
   a tongue including a head mounting surface for attaching the head;
   a first arm on a first side of the tongue, the first arm comprising a structural material and having a first cross-sectional area in a plane perpendicular to the head mounting surface, the first cross-sectional area having a first centroid;
   a second arm on the first side of the tongue, the second arm comprising a layer of conductive material that is not the same as the structural material, the second arm having a second cross-sectional area in the plane perpendicular to the head mounting surface, the second cross-sectional area having a second centroid, wherein the second centroid is not offset from the first centroid by more than 10 microns in a direction perpendicular to the head mounting surface;
   a third arm on a second side of the tongue, the third arm comprising the structural material and having a third cross-sectional area in the plane perpendicular to the head mounting surface, the third cross-sectional area having a third centroid; and
   a fourth arm on the second side of the tongue, the fourth arm comprising the conductive material, the fourth arm having a fourth cross-sectional area in the plane perpendicular to the head mounting surface, the fourth cross-sectional area having a fourth centroid, wherein the third centroid is not offset from the fourth centroid by more than 10 microns in a direction perpendicular to the head mounting surface.

7. The flexure of claim 6, wherein the fourth arm is substantially parallel to the third arm.

8. The flexure of claim 6, wherein the first centroid, the second centroid, the third centroid, and the fourth centroid are not offset from one another by more than 10 microns in a direction perpendicular to the head mounting surface.

9. The flexure of claim 1, wherein the structural material comprises steel.

10. The flexure of claim 9, wherein the steel is stainless steel.

11. The flexure of claim 1, wherein the second arm further comprises a dielectric material layer comprising polyimide.

12. The flexure of claim 1, wherein the layer of conductive material comprises copper.

13. The flexure of claim 1, wherein the first arm is farther from the tongue than is the second arm.

14. The flexure of claim 1, wherein the first arm is closer to the tongue than is the second arm.

15. The flexure of claim 1, wherein the first arm comprises a substantially planar first portion and the second arm comprises a substantially planar second portion that is substantially co-planar with the first portion.

16. The flexure of claim 15, wherein the first portion is configured to flex in a flexing direction, the second portion is configured to flex in the flexing direction, and the second portion is substantially co-planar with the first portion in a plane substantially perpendicular to the flexing direction.

17. A flexure for supporting a head in a disk drive, the flexure comprising:
- a tongue including a head mounting surface for attaching the head;
- a first arm on a first side of the tongue, the first arm comprising a structural material and having a first cross-sectional area in a plane perpendicular to the head mounting surface, the first cross-sectional area having a first centroid; and
- a second arm on the first side of the tongue, the second arm comprising a layer of conductive material that is not the same as the structural material, the second arm having a second cross-sectional area in the plane perpendicular to the head mounting surface, the second cross-sectional area having a second centroid, wherein the second centroid is not offset from the first centroid by more than 10 microns in a direction perpendicular to the head mounting surface;
- wherein the first arm comprises one or more extensions extending generally toward the second arm and mechanically coupled to the second arm.

18. A flexure for supporting a head in a disk drive, the flexure comprising:
- a tongue including a head mounting surface for attaching the head;
- a first arm on a first side of the tongue, the first arm comprising a structural material and having a first cross-sectional area in a plane perpendicular to the head mounting surface, the first cross-sectional area having a first centroid; and
- a second arm on the first side of the tongue, the second arm comprising a layer of conductive material that is not the same as the structural material, the second arm having a second cross-sectional area in the plane perpendicular to the head mounting surface, the second cross-sectional area having a second centroid, wherein the second centroid is not offset from the first centroid by more than 10 microns in a direction perpendicular to the head mounting surface;
- wherein the second arm comprises one or more extensions extending generally toward the first arm and mechanically coupled to the first arm.

19. The flexure of claim 18, wherein the first arm comprises one or more extensions extending generally toward the second arm, the one or more extensions of the first arm mechanically coupled to the one or more extensions of the second arm.

* * * * *